(12) United States Patent
Lardner

(10) Patent No.: US 11,748,716 B2
(45) Date of Patent: Sep. 5, 2023

(54) SYSTEM AND METHOD FOR AUTOMATICALLY MONITORING RECYCLABLE MATERIALS

(71) Applicant: Shapiro Sales Company, St. Louis, MO (US)

(72) Inventor: Charles Lardner, St. Louis, MO (US)

(73) Assignee: SHAPIRO SALES COMPANY, St. Louis, MO (US)

(*) Notice: Subject to any disclaimer, the term of this patent is extended or adjusted under 35 U.S.C. 154(b) by 1139 days.

(21) Appl. No.: 16/296,556

(22) Filed: Mar. 8, 2019

(65) Prior Publication Data

US 2019/0279168 A1   Sep. 12, 2019

Related U.S. Application Data

(60) Provisional application No. 62/640,907, filed on Mar. 9, 2018.

(51) Int. Cl.
| | |
|---|---|
| *G06Q 10/00* | (2023.01) |
| *G06Q 10/30* | (2023.01) |
| *G01G 19/08* | (2006.01) |
| *G06T 7/62* | (2017.01) |
| *B65D 90/51* | (2019.01) |
| *G01G 17/00* | (2006.01) |
| *G01G 19/02* | (2006.01) |
| *G01G 19/52* | (2006.01) |
| *G01G 19/414* | (2006.01) |
| *G06Q 10/0631* | (2023.01) |

(52) U.S. Cl.
CPC ............ *G06Q 10/30* (2013.01); *B65D 90/51* (2019.02); *G01G 17/00* (2013.01); *G01G 19/021* (2013.01); *G01G 19/08* (2013.01); *G01G 19/083* (2013.01); *G01G 19/414* (2013.01); *G01G 19/52* (2013.01); *G06Q 10/06314* (2013.01); *G06T 7/62* (2017.01)

(58) Field of Classification Search
CPC .. G06Q 10/30; G06Q 10/06314; B65D 90/51; G01G 17/00; G01G 19/021; G01G 19/414; G01G 19/52; G01G 19/08; G01G 19/083
USPC ........................................................ 705/7.24
See application file for complete search history.

(56) References Cited

U.S. PATENT DOCUMENTS

| | | | |
|---|---|---|---|
| 9,098,825 B2* | 8/2015 | Bashkin | ................. H04N 5/247 |
| 11,610,185 B2* | 3/2023 | Gates | ................. G06Q 10/0631 |

(Continued)

*Primary Examiner* — Aditya S Bhat
(74) *Attorney, Agent, or Firm* — THE SMALL PATENT LAW GROUP LLC; Philip S. Hof

(57) ABSTRACT

A system includes one or more processors located remote from a plurality of containers configured to store recyclable material. The one or more processors are configured to receive image data generated by an imaging device positioned to have a field of view of an interior of a first container of the containers. The image data depicts the recyclable material within the first container. The one or more processors receive one or more weight measurements of the first container with the recyclable material therein and determine one or more characteristics of the recyclable material within the first container based on at least one of the image data or the one or more weight measurements. The one or more processors schedule a pickup date for the first container based on the one or more characteristics of the recyclable material that are determined.

20 Claims, 3 Drawing Sheets

(56) References Cited

U.S. PATENT DOCUMENTS

| | | | |
|---|---|---|---|
| 2014/0278630 A1* | 9/2014 | Gates | G06Q 10/047 |
| | | | 705/7.13 |
| 2017/0011363 A1* | 1/2017 | Whitman | G06K 7/10009 |
| 2017/0200135 A1* | 7/2017 | Whitman | G06K 7/10009 |
| 2019/0197498 A1* | 6/2019 | Gates | H04N 7/181 |

* cited by examiner

SYSTEM AND METHOD FOR AUTOMATICALLY MONITORING RECYCLABLE MATERIALS

CROSS-REFERENCE TO RELATED APPLICATIONS

This application claims priority to U.S. Provisional Patent Application No. 62/640,907, filed 9 Mar. 2018, and entitled System and Method For Automatically Communicating A Summary Of Characteristics Of Recyclable Materials. The entire disclosure of which is incorporated herein by reference.

FIELD

The subject matter described herein relates to automatically tracking, recording, and/or communicating characteristics of recyclable materials between a provider and processor of the recyclable materials.

BACKGROUND

Recyclable materials, such as copper, aluminum, and/or the like, can be recycled at a processing facility. The recyclable materials are collected in return for a payment for the recyclable materials from the processing facility. However, the payment does not always provide objective feedback on the recyclable material. For example, the condition of the recyclable material for recycling, amount of recyclable material, market price, and/or the like are not provided with the payment. Based on the lack of objective feedback, distrust and confusion can form between the processing facility and the provider of the recyclable material.

BRIEF DESCRIPTION

In one or more embodiments, a system is provided that includes one or more processors located remote from a plurality of containers configured to store recyclable material. The one or more processors are configured to receive image data generated by an imaging device positioned to have a field of view of an interior of a first container of the containers. The image data depicts the recyclable material within the first container. The one or more processors receive one or more weight measurements of the first container with the recyclable material therein and determine one or more characteristics of the recyclable material within the first container based on at least one of the image data or the one or more weight measurements. The one or more processors schedule a pickup date for the first container based on the one or more characteristics of the recyclable material that are determined.

In one or more embodiments, a system is provided that includes one or more processors located remote from a plurality of containers. The one or more processors are configured to receive image data generated by an imaging device positioned to have a field of view of an interior of a first container of the containers. The image data depicts recyclable material within the first container. The one or more processors are configured to determine a fullness level and/or a fill rate of the recyclable material within the first container based on the image data, and to schedule a pickup date for the first container based on at least one of the fullness level or the fill rate. The one or more processors generate a notification message for communication to an entity in possession of the first container. The notification message provides the scheduled pickup date.

In one or more embodiments, a system is provided that includes monitoring devices and one or more processors. The monitoring devices are located at a container configured to hold recyclable material and are configured to generate data representing different corresponding monitored parameters of the recyclable material within the container. The one or more processors are located remote from the container and the monitoring devices and are configured to receive the data generated by the monitoring devices. The one or more processors are configured to determine multiple characteristics of the recyclable material based on the monitored parameters. The characteristics include a fullness level of the recyclable material within the container, a fill rate of the recyclable material within the container, a type of the recyclable material within the container, a weight of the recyclable material within the container, or a presence of other materials besides the recyclable material within the container. The one or more processors are configured to generate a summary that provides one or more of the characteristics of the recyclable material that are determined, and the one or more processors are configured to control communication of the summary to a computing device of an entity that deposited the recyclable material into the container.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
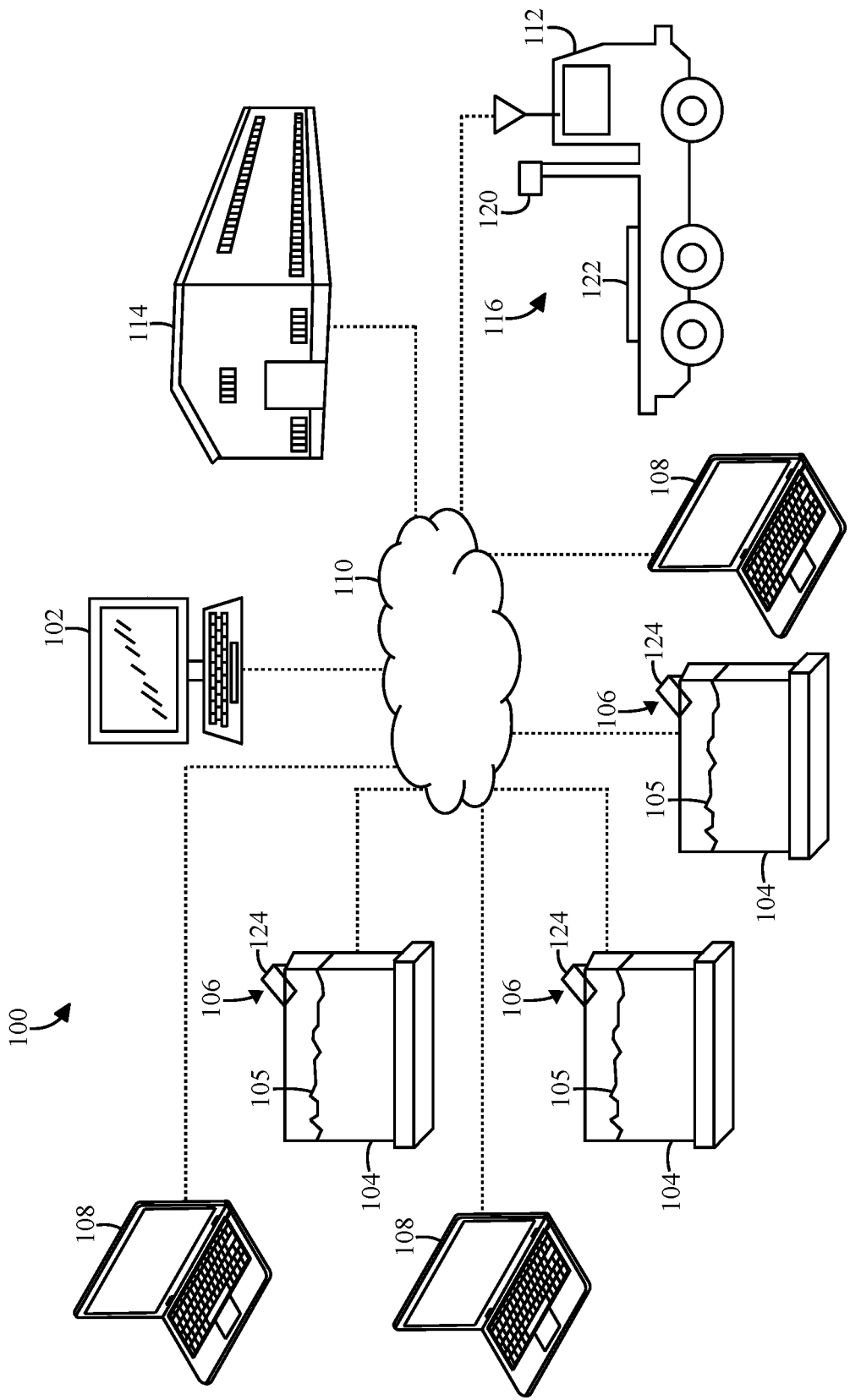
FIG. 1 illustrates a monitoring system according to an embodiment.

Embodiments described herein utilize one or more monitoring devices to monitor recyclable materials collected within one or more containers. The systems and methods utilize monitoring devices that generate data representing different monitored parameters of the recyclable material within the containers. The data from the monitoring devices is communicated remotely to a subsystem, which may be or include one or more computing devices or servers. The remote subsystem is configured to analyze the data from the monitoring devices associated with one or more of the containers to determine characteristics of the recyclable material within the one or more containers. The characteristics may include a fullness level of the recyclable material within the container, a fill rate of the recyclable material within the container, a type of the recyclable material within the container, a weight of the recyclable material within the container, a presence of other materials besides the recyclable material within the container, and/or the like.

Based on at least one of the characteristics of the recyclable material that are determined, the remote subsystem is configured to automatically initiate one or more responsive actions. For example, based on the fullness level and/or the fill rate of recyclable material within a given container, the remote subsystem may schedule a pickup date for the container. The pickup date is scheduled such that the container is picked up and transported from a client site before the amount of recyclable material deposited into the container exceeds a designated capacity level and/or overflows. The automatic scheduling of pickups eliminates an ongoing concern of the client company (e.g., client) because the client does not need to actively monitor the fullness of the container and initiate a request to the processing company (e.g., processor) to come pick up the container. The automatic scheduling of pickups may also be helpful for the processor by potentially reducing unnecessary pickups, which can increase operation efficiency (and reduce costs). For example, if the pickups are scheduled based on a fixed period or interval, sometimes the processor may pick up a container that is less than half filled, such that the pickup is unnecessary.

As is typical in the industry, after picking up a container from a client, a processor transports the container to process the recyclable material and provide payment to the client based on the amount, type, and/or condition (e.g., purity) of the recyclable material. For the purpose of providing transparency in the process, the remote subsystem is configured to provide various information about the recyclable material to a client throughout the processing stages. The information made available to the client may include an estimated weight of the recyclable material at pickup of the container at the client site, one or more weight measurements of the recyclable material after pickup (e.g., at a processing facility and/or at a weigh station), visual documentation of the recyclable material integrated with the weight measurements, current pricing information for a relevant type of recyclable material, historical information related to recyclable material deposited in the past by the same client, and/or the like. This objective feedback reduces client distrust and alleviates client confusion with the process by establishing, with evidence, a direct chain of custody and providing an upfront price breakdown for the recyclable material picked up from the client site.

Furthermore, even before pickup of a container, the embodiments described herein may provide driver information to the client that identifies the driver that is scheduled to pick up the container at the scheduled pickup date. In addition to the driver's identity, such as name and/or picture, the driver information provided to the client may include a current location of the vehicle driven by the driver for tracking, an expected pickup time during the pickup date, or the like. The supply of driver information prior to container pickup is configured reduce client distrust and suspicion regarding whether the person entering the client site to take the container filled with recyclable material is actually an authorized agent of the processor. The system and method described herein are configured to make all details of the exchange of recyclable materials transparent to all parties involved.

FIG. 1 illustrates a monitoring system 100 according to an embodiment. The monitoring system 100 includes a remotely located subsystem 102. The remotely located subsystem 102 may be or include one or more computers and/or one or more servers. The remotely located subsystem 102 (also referred to herein as remote subsystem) is located remote to client sites on which containers 104 are temporarily stored for the client to deposit recyclable material into the containers 104. The containers 104 may be any type of bin configured to receive scrap metal. One or more of the containers 104 may be longer than ten feet (three meters) in length. In FIG. 1 the walls of the containers 104 are illustrated as transparent to show a surface topology 105 of the recyclable material within the containers 104.

The remote subsystem 102 is communicatively connected to monitoring devices 106 located at the containers 104. The remote subsystem 102 may communicate with the monitoring devices 106 via uni-directional and/or bi-directional communication links. The communicating links may utilize a network 110, such as a cellular network, the Internet, a local area network (LAN), or the like. In the illustrated embodiment, the network 110 is a wireless network, such as a cellular network. The communication links may include or represent a wired communication pathway (e.g., via a physical conductor) and/or a wireless communication pathway (e.g., utilizing radio frequency (RF)) for exchanging data (e.g., data packets) between the remote subsystem 102, the monitoring devices 106, client computing devices 108, and/or the like. The communication links may be based on a customized communication protocol and/or a standard communication protocol, such as Ethernet, TCP/IP, Wi-Fi, 802.11, Bluetooth, and/or the like.

The monitoring devices 106 are configured to monitor parameters of the recyclable material within the containers 104. The monitoring devices 106 generate data that represents corresponding monitored parameters. For example, one or more of the monitoring devices 106 may be sensors that generate data in the form of sensor measurements, and other monitoring devices 106 include imaging devices that generate image data. The monitoring devices 106 may communicate the generated data to the remote subsystem 102 in the form of signals, such as analog and/or digital signals. The remote subsystem 102 as described herein is configured to receive the data from the monitoring devices 106 and analyze the data to determine multiple characteristics of the recyclable material within the containers 104 based on the monitored parameters. The characteristics may include a fullness level of the recyclable material within each container, a fill rate of the recyclable material within each container, a type of the recyclable material within each container, a weight of the recyclable material within each container, and/or a presence of other materials besides the recyclable material within each container.

In the illustrated embodiment, the monitoring devices 106 include imaging devices 124 that generate image data of the recyclable material within the corresponding container 104. For example, each imaging device 124 may be positioned relative to the corresponding container 104 to have a field of view of an interior of the container 104. The imaging devices 124 may be mounted to a wall of the containers 104. The imaging devices 124 may be cameras, optical sensors, or the like. To respect client privacy, the field of view of the imaging devices 124 may be entirely or at least substantially limited to the interior of the container 104 to avoid capturing images of the client site, including any proprietary subject matter on the site. The image data may include still images and/or video. In an embodiment, the imaging devices 124 are controlled to generate a still image according to a predetermined schedule. The schedule may be periodical on a set interval, such as once every eight hours. Alternatively, the schedule is not a set interval, and the imaging devices 124 may be controlled to generate an image at three designated times each day, such as 8 AM, noon, and 4 PM. The image data is utilized by the remote subsystem 102 to monitor the fullness of the recyclable material in the containers 104, and possibly for monitoring other characteristics as well. Although only the imaging devices 124 are shown at the containers 104 in FIG. 1, the monitoring system 100 may include additional and/or different monitoring devices at the containers besides or instead of the imaging devices 124.

The monitoring system 100 also includes a vehicle 112 configured to transport the containers 104. The vehicle 112 may be a truck having a bed designed to accommodate a container. The truck may include machinery for lifting and/or pulling the containers onto the bed. The vehicle 112 is communicatively connected to the remote subsystem 102 via a uni-directional and/or bi-directional communication link, such as utilizing the network 110. In an embodiment, the vehicle 112 includes at least one monitoring device 116. Like the monitoring devices 106 at the containers 104, each monitoring device 116 on the vehicle 112 is configured to generate data that represents a corresponding monitored parameter of recyclable material within a corresponding container 104 that is disposed onboard the vehicle 112. For example, the monitoring devices 116 may monitor the recyclable material within a container 104 at the time that the container 104 is picked up from a client site and while the vehicle 112 transports the container 104 for processing. In the illustrated embodiment, the monitoring devices 116 onboard the vehicle 112 includes an imaging device 120 and a weight sensor 122 (e.g., scale). The weight sensor 122 is configured to generate a weight measurement of a container 104 disposed on the bed of the vehicle 112, which represents a combined weight of the empty container 104, the recyclable material within the container, and any additional materials within the container, such as water and other building materials (e.g., bricks, plaster, non-recyclable metal, etc.). The imaging device 120 may be mounted and positioned on the vehicle 112 to enable the field of view of the imaging device 120 to include an interior of the container 104 that is loaded on the vehicle 112 for capturing the recyclable material within the container 104 in the image data.

The monitoring system 100 optionally includes a processing facility 114, or one or more components at the processing facility 114. The processing facility 114 represents a location for processing the recyclable material deposited into the containers 104. For example, the processing facility 114 receives the recyclable material from the containers and converts the recyclable material into a recycled material. The remote subsystem 102 optionally may be located at the processing facility 114. Alternatively, the remote subsystem 102 is located remote from the processing facility 114, such as at a dispatch location for the processor company or a data center that houses servers, computers, and the like. The processing facility 114 may include one or more monitoring devices (not shown), such as one or more scales for measuring a weight of the vehicle 112 loaded with or without a container 104 loaded on the vehicle 112, a weight of a container 104 alone (without the vehicle 112), or the like. The monitoring devices at the facility 114 may also include one or more imaging devices separate from the imaging devices 120, 124 described above. The imaging devices at the facility 114 may be located proximate to the weight scales and configured to generate image data of a container 104, recyclable material within the container 104, and/or the vehicle 112 while the container 104 and/or vehicle 112 is disposed on one of the weight scales.

The monitoring system 100 also includes one or more client computing devices 108, which are also referred to herein as endpoints. The client computing devices are owned by, or at least in possession of, the client companies that have containers 104 located on their sites. Each of the client computing devices 108 is communicatively connected to the remote subsystem 102 via a uni-directional and/or bi-directional communication link, such as utilizing the network 110. The client computing devices 108 may include desktop computers, laptop computers, tablet computers, smartphones, wearable computers, and/or the like. The remote subsystem 102 is configured to communicate with a client entity (e.g., a company or agent) via the computing devices 108. For example, the remote subsystem 102 may be configured to communicate notification messages to the client entity for display on the computing device 108. The notification messages may include information about scheduled pickup date, driver information, characteristics about the recyclable material picked up from the client, payment information based on the recyclable material picked up from the client, and/or the like. Optionally, as described herein in more detail, the client entity may be configured to utilize the computing device 108 to unilaterally initiate access to such information through logging into a client account via a web portal and/or a downloaded application. The monitoring system 100 is configured to make the material recycling process more transparent and simplified by making such information readily available to the client via the network 110. The client may be able to access the personalized client account from any computing device by entering appropriate login credentials.

Figure 2:
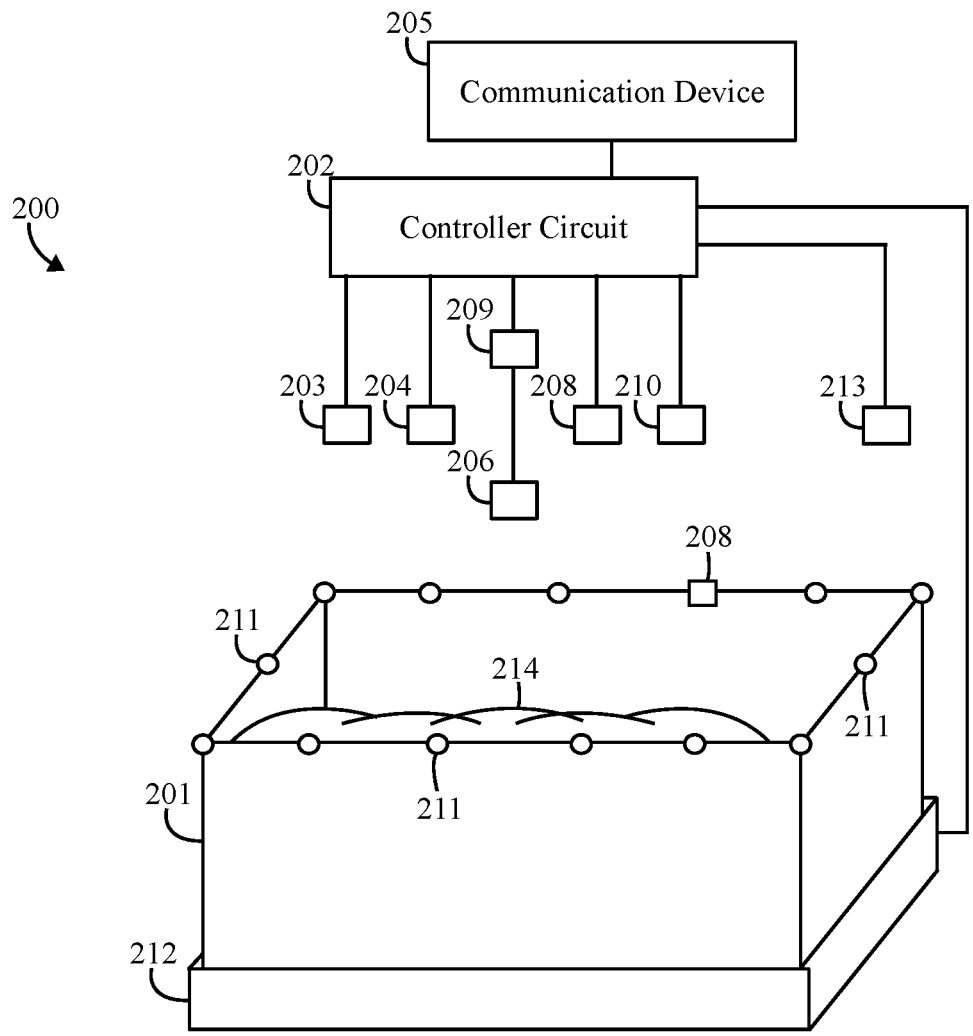
FIG. 2 schematically illustrates an array of monitoring devices for monitoring recyclable material within a container according to an embodiment.

FIG. 2 schematically illustrates an array of monitoring devices 200 for monitoring recyclable material 214 within a container 201 according to an embodiment. The container 201 may be one of the containers 104 shown in FIG. 1, and the monitoring devices 200 may represent examples of the monitoring devices 106 shown in FIG. 1. Although only one container 201 is shown, similar arrays of monitoring devices 200 may be located at other containers 201 and used to monitor the recyclable material in the other containers 201.

The monitoring devices 200 may be operably connected to a controller circuit 202 located at or proximate to the container 201. The controller circuit 202 is configured to control the operation of the monitoring devices 200. The controller circuit 202 may include one or more processors. Optionally, the controller circuit 202 may include a central processing unit (CPU), one or more microprocessors, or any other electronic component capable of processing inputted data according to specific logical instructions. Optionally, the controller circuit 202 may include and/or represent one or more hardware circuits or circuitry that include, are connected with, or that both include and are connected with one or more processors, controllers, and/or other hardware logic-based devices. Additionally or alternatively, the controller circuit 202 may execute programmed instructions stored on a tangible and non-transitory computer-readable medium (e.g., a memory).

The controller circuit 202 may be operably coupled to and/or control a communication device 205 located at or proximate to the container 201. The communication device 205 is configured to receive and/or transmit information with the remote subsystem 102 (shown in FIG. 1), and/or the like. The communication device 205 may represent hardware that is used to transmit and/or receive data along uni-directional and/or bi-directional communication links. The communication device 205 may include a transceiver, receiver, transmitter, and associated circuitry (e.g., antennas), for wirelessly communicating with (e.g., transmitting, broadcasting, and/or receiving) the remote subsystem 102.

The controller circuit 202 transmits data (e.g., monitored parameters) generated by the monitoring devices 200 to the remote subsystem 102.

The controller circuit 202 may control the operation of the monitoring devices 200 by instructing when the monitoring devices 200 generate data representing monitored parameters of the recyclable material 214, such as by capturing images, acquiring measurements, and/or the like. For example, the controller circuit 202 may instruct a camera 204 of the monitoring devices 200 to acquire images of the recyclable material 214 at predetermined intervals during a monitoring period. The controller circuit 202 may also control the monitoring devices 200 may adjusting a position of one or more of the devices 200, focusing one or more of the devices 200, or the like.

In the illustrated embodiment, the monitoring devices 200 in the array associated with the container 201 include an infrared sensor (e.g., IR camera) 203, the camera 204, a magnet 206, a load sensor 209, a proximity sensor 208, a moisture sensor 210, a structure light array 211, a weight sensor 212, and an X-ray sensor 213. It is recognized that this list of devices is merely a non-limiting example, and the array of monitoring devices 200 associated with each container 201 may include more monitoring devices, fewer monitoring devices, and/or one or more different monitoring devices in alternative embodiments.

The monitoring devices 200 are utilized to monitor different parameters (e.g., properties) of the recyclable material 214. The different monitored parameters may be analyzed by one or more processors of the remote subsystem 102 to determine one or more characteristics of the recyclable material 214.

For example, one or more of the monitored parameters are used to determine a fullness or volume of the recyclable material 214 within the container 201, which represents one of the characteristics of the recyclable material 214. The fullness may be a relative term that represents a ratio of the volume of the recyclable material 214 to a total capacity or volume of the container 201. The fullness of the recyclable material 214 can be determined based on one or more images acquired by the camera 204. For example, the remote subsystem 102 (or another computing device) may perform image analysis on an image generated by the camera 204 to identify boundaries of the recyclable material 214 relative to designated markers of the container 210 to determine a distance or depth from the boundaries to the markers. The markers may indicate a capacity level of the container 201 that is associated with the container 201 reaching a full capacity of contents. The markers may be top edges of the container 201 at the tops of the walls, or a designated position along the walls below the top edges. The boundaries may be identified by using image analysis to identify a first subset of pixels in the images that represent the recyclable material and a second subset of pixels adjacent to the first subset that represent walls of the container. The dimensions of the container 201 may be known and stored (e.g., in a local memory or in an accessible database). The relative volume of the recyclable material to the container can be determined based on the stored dimensions of the container 201 and the determined distance or depth from the boundaries of the recyclable material 214 to the designated markers of the container 201.

In a non-limiting example, if the dimensions of the container 201 are 10 ft long and 6 ft wide, and it is determined that the upper boundary of the recyclable material 214 is 2 ft below the designated capacity markers, then the available space or volume remaining within the container 201 is 120 ft$^3$ (10 ft×6 ft×2 ft). If the total capacity or volume of the container is 500 ft$^3$, then the volume of the recyclable material is 380 ft$^3$ (500 ft$^3$-120 ft$^3$), and the fullness or volume ratio of recyclable material within the container is 0.76 (380 ft$^3$/500 ft$^3$), indicating that the container is 76% full.

Alternatively, the image analysis may be used to generate a three-dimensional model of the surface topology of the recyclable material, instead of merely determining boundaries between the recyclable material and the walls of the container. The three-dimensional model of the surface topology may be used to provide a more accurate estimation of the volume or fullness than relying on the boundaries, as the distance or depth from the surface of the recyclable material to the designated capacity markers of the container may be calculated for hundred or thousands or points along a plane.

Alternatively, the volume of the recyclable material 214 can be determined by different devices other than the camera 204. For example, the proximity sensor 208 can be used to measure a distance between a top surface of the recyclable material 214 to the designated reference markers of the container 201, such as the top edges of the walls. The proximity sensor 208 may be mounted above the top of the container 201, at the top edges of the walls, or on the walls below the top edges. The proximity sensor 208 may be calibrated to detect the distance of the recyclable material 214 below the reference markers of the container 201. Based on the known dimensions of the container 201, this distance (or depth) can be used to calculate the volume or fullness of the recyclable material 214, as described above.

In another embodiment, the volume of the recyclable material 214 can be determined based on an x-ray image generated by the x-ray sensor 213. The x-ray image includes a group of pixels representing the recyclable material 214 within the container 201. The remote subsystem 102 can determine the volume from the dimensions of the grouping of pixels representing the recyclable material within the container.

In yet another embodiment, the volume can be determined based on the structure light array 211, which can be utilized to indicate a position of the recyclable material 214 within the container 201. The structured light array 211 includes a plurality of photonic generators, which apply a spatial pattern (e.g., binary code, De Bruijn sequence, M-array) to the recyclable material 214 from the photonic generators. Based on changes in contours and/or separation of the pattern overlaid on the recyclable material 214, a position of the top surface (or surface topology) of the recyclable material 214 within the container 201 can be detected. The position of the top surface of the recyclable material relative to designated markers of the container (having known dimensions) can be used by the remote subsystem 102 to determine a volume of the recyclable material, as described above.

Optionally, the volume or fullness of the recyclable material 214 can be determined (e.g., calculated, estimated, etc.) using more than one of the techniques described above, and the resultant values of the volume or fullness can be compared for verification purposes. The extent of agreement in the resultant values may correspond to a confidence level, such that values that are within a narrow range of each other indicate a greater confidence in the values than values that have a greater variation.

Another one of the characteristics of the recyclable material 214 that may be determined based on the monitored parameters is a fill rate. The fill rate may be determined by analyzing the image data generated by the camera 204 over time to track the amount of recyclable material deposited into the container 201 over time. For example, the remote subsystem 102 can periodically determine the fullness or volume of the recyclable material 214 within the container 201, such as once every day or every time an updated image is received. Based on the multiple fullness values aggregated over a known period of time, the remote subsystem 102 can determine a rate (e.g., fill rate) at which the recyclable material is deposited into the container. For example, the fill rate may be determined to be a 4% increase in fullness each day. Based on the fill rate, the remote subsystem 102 can extrapolate to predict when the amount (e.g., volume) of the recyclable material 214 within the container 201 will reach or exceed the capacity level. This predicted date may be referred to as an overflow rate, as it represents when the recyclable material 214 may exceed the container's designated capacity.

The characteristics of the recyclable material 214 may also include the weight of the recyclable material 214 within the container 201. The weight of the recyclable material 214 within the container 201 can be determined based on one or more weight measurements generated by weight sensors, such as the weight sensor 212. The weight sensor 212 may represent a scale configured to measure the weight of the recyclable material 214 within the container 201. The weight sensor 212 may be located within the container 201, such as disposed along a floor or under the floor of the container 201, and configured to directly measure the weight of the recyclable material 214. Alternatively, the weight sensor 212 may measure the total or combined weight of the container 201 with the recyclable material 214 therein. In such a situation, the weight of the recyclable material 214 alone is determined by subtracting a known, pre-measured weight of the container 201 when empty from the measured combined weight. For example, if the combined weight measured by the sensor 212 is 30,000 pounds (lbs) and the pre-measured weight of the empty container 201 is 10,000 lbs, then the weight of the recyclable material 214 can be estimated as 20,000 lbs.

Although the weight sensor 212 is described as a scale, the weight sensor 212 alternatively may represent a hydraulic force-measuring system, a pneumatic force-measuring system, and/or the like. For example, the weight sensor may be a pneumatic system, and a pressure of the pneumatic system may increase responsive to material being added to the container 201. A gauge and/or a pressure sensor may monitor the pressure of the pneumatic system. The measurements of the gauge may be transmitted to the remote subsystem 102, which converts the pressure measurements to weights (e.g., weight values) based on a conversion or transformation function.

Another of the characteristics of the recyclable material 214 that may be determined based on the monitored parameters is a type of the recyclable material 214 within the container 201. The type refers to a composition or identity of a primary component (e.g., compound, metal alloy, substance, or the like) within the recyclable material 214. One potential type of recyclable material is steel and another type is copper. The type of the recyclable material can be determined based on a density of the recyclable material, the emissivity of the recyclable material, the diffraction responsive to x-rays or other charged particles, and/or the like.

The density is determined based on the volume and the weight of the recyclable material 214 within the container 201. The volume of the recyclable material can be determined by performing image analysis on the image date generated by the camera 204. For example, in the non-limiting example calculation provided above, it was determined via image analysis and stored dimensions of the container 201 that the volume of the recyclable material 214 in the container 201 was 380 ft$^3$. Alternatively, the volume can be determine using the x-ray sensor 213, the structured light array 211, or the like. The weight of the recyclable material 214 can be determined utilizing the weight sensor 212, as described above. The density can be calculated by dividing the weight (which is used to represent the mass) of the recyclable material 214 by the volume of the recyclable material 214.

Once the density of the recyclable material is calculated, the type of recyclable material can be predicted by comparing the calculated density to a list of densities in a look-up table stored in a database. The look-up table lists the densities of known materials and compounds. If the calculated density is within a designated tolerance margin (e.g., 1%, 3%, 5%, or the like) of the density of a given material in the look-up table, then the remote subsystem 102 may determine that the given material is the primary component of the recyclable material. For example, this density-based approach may be used to determine that the recyclable material 214 (e.g., or at least the primary component thereof) is copper, steel, aluminum, iron, or the like.

As an alternative to the density-based approach, the type of the recyclable material may be determined using the infrared sensor 203. The infrared sensor 203 may be used to measure an amount of thermal radiation emitted from the recyclable material at ambient temperature, also known as an emissivity of the recyclable material. For example, the infrared sensor measures thermal radiation emitted by the recyclable material to have an emissivity value of 0.04, which is unitless because it is a relative value. By comparing the measured emissivity to a list of known emissivity values for known materials and/or compounds, the remote subsystem 102 may determine that the recyclable material 214 is aluminum. It may be noted, the thermal radiation emitted and/or detected by the infrared sensor 203 are based on control values. The thermal radiation emissivity values are based on, "Thermal Radiative Transfer and Properties," by M. Quinn Brewster. For example, the thermal radiation emitted from the recyclable material may be changed based on environmental factors such as temperature, humidity, density, water along a surface of the recyclable material, and/or the like. The thermal radiation emitted from the recyclable material is an estimation and may be adjusted based on the environmental factors of the recyclable material.

Alternatively, the x-ray sensor 213 may be used to determine the type of the recyclable material 214 based on the diffraction of emission levels emitted from the recyclable material 214. The x-ray sensor 213 may measure a characteristic spectrum of the recyclable material 214. The characteristic spectrum represents energy and/or emission levels of the x-rays of the recyclable material. The emission levels can represent x-ray diffraction of the recyclable material, which forms peaks at mean excitation energies along the characteristic spectrum. For example, the mean excitation energies are based on gray levels detected by the x-ray sensor. The gray levels correspond to an amount of joules/kilogram of the recyclable material, which can be converted to eV. The mean excitation energies may be specific to the type of material. Therefore, based on the measured mean excitation energy of the diffraction along the characteristic spectrum, the type of the recyclable material 214 can be determined using a look-up table. For example, the remote subsystem 102 may measure the eV at approximately 286 eV, which, when compared to a list of energies in a look-up table, corresponds to iron. It may be noted, the emission levels emitted from the recyclable material and/or detected by the x-ray sensor are based on control values. The emission levels are based on The National Institute of Standards and Technology. For example, the emission levels emitted from the recyclable material may be changed based on environmental factors such as temperature, humidity, density, water along a surface of the recyclable material, and/or the like. The emission levels emitted from the recyclable material are estimations and may be adjusted based on the environmental factors of the recyclable material.

Alternatively, the magnet 206 can be used with or without other monitoring devices 200 to determine the type of the recyclable material 214. The magnet 206 may represent a permanent magnet, an electromagnet, and/or the like. For example, the magnet 206 is configured to generate a magnetic field, such that the recyclable material 214 is positioned within the magnetic field. The magnet 206 can be utilized to determine if the recyclable material includes ferrous material (or is non-ferrous). For example, when the magnetic field is in contact with the recyclable material, the proximity sensor 208 and/or the structured light array 211 may indicate movement of the recyclable material 214 responsive to the magnetic field if the recyclable material 214 does include ferrous material.

Yet another characteristic of the recyclable material 214 that can be determined based on the monitored parameters generated by the monitoring devices 200 is a presence of other materials besides the recyclable material 214 within the container 201. The other materials refer to materials other than the primary material that represents a majority of the weight and/or volume of the recyclable material 214. The other materials may include plaster, bricks, glass, metals other than a type of metal that is the primary material, and the like. The other materials optionally may also include water, such as from precipitation.

The presence of a second type of material that is mixed in with the primary material of the recyclable material 214 in the container 201 may be determined based on a mismatch or disparity between the determined density of the recyclable material 214 and the measured emissivity and/or diffraction. For example, the emissivity measured by the infrared sensor 203 and/or the diffraction measured by the x-ray sensor 213 indicates that the recyclable material 214 is aluminum (based on a look-up table). The calculated density of the recyclable material 214 based on the volume and weight of the recyclable material 214 deviates from a known density of aluminum by more than a tolerance margin (e.g., 5%, 10%, 20%, or the like). Based on the mismatch, the remote subsystem 102 may determine that at least a second type of material is in the container 201.

The remote subsystem 102 may be configured to determine the type of the second material based on the x-ray sensor 213 and/or the infrared sensor 203. For example, the remote subsystem 102 may identify the type of the second material based on the diffraction emission level monitored by the x-ray sensor 213 and/or the emissivity of the thermal radiation monitored by the infrared sensor 203. Additionally or alternatively, the magnet 206 can be utilized to identify the second material, or at least identify if the second material is ferrous. The magnet is operably coupled to the load sensor 209, which is configured to determine an amount of weight coupled to the magnet 206. The magnet 206 is configured to generate the magnetic field such that the recyclable material is positioned within the magnetic field. For example, if the recyclable material 214 (e.g., the primary material) is non-ferrous, and the second material is ferrous, the second material may be expected to be attracted to the magnet 206 while the recyclable material 214 remains within the container 201. The remote subsystem 102 receives the weight of the material lifted from the container 201 by the magnet 206, as measured by the load sensor 209. Based on a difference between the weights measured by the load sensor 209 and the weight sensor 212 under the container 201, the remote subsystem 102 can determine that the container includes a second material that is ferrous, and also can determine a weight (e.g., amount) of the second material within the container 201.

The presence of water within the container 201 may distort or misrepresent the measured weight of the recyclable material 214, because some of the weight would be attributable to the water instead of the recyclable material 214. In an embodiment, the remote subsystem 102 can determine the presence of water and/or the amount of such water in the container 201 based on measurements from the one or more moisture sensors 210. The moisture sensors 210 are configured to measure an amount of water and/or moisture within and/or outside the container 201. The moisture sensors 210 can be positioned within the container 201, such as at or proximate to a floor of the container 201. For example, multiple moisture sensors 210 may be disposed at different heights along the walls of the container 201. The moisture sensor 210 may measure a depth of water within the container 201. Based on the amount of water within the container 201, the remote subsystem 102 can adjust the measured weight of the recyclable material 214. For example, the amount of water can be calculated by multiplying the measured depth of the water by the known dimensions of the container 201. The weight attributable to the water can be determined by multiplying this calculated volume of water by the known density of water. Then, the weight attributable to the water can be subtracted from the determined weight of the recyclable material 214 to calculate a more accurate, adjusted weight of the recyclable material 214 that accounts for the presence of water. For example, the weight of the recyclable material 214 can be calculated by determining the total combined weight of the container 201 including its contents, and then subtracting from this combined weight the known weight of the empty container 201 and the determined weight attributable to water. Thus, in the hypothetical weight calculation described above, in which the weight sensor 212 measures a combined weight of the container 201 and its contents to be 30,000 lbs and the empty container weighs 10,000 lbs, if the determined weight of water in the container is 4,000 lbs, then the weight of the recyclable material 214 is estimated at 16,000 lbs (e.g., 30,000−10,000−4,000=16,000).

Alternatively, the moisture sensor 210 may be above or outside of the container 201. For example, the moisture sensor 210 may measure precipitation, such as rainfall, over time in a region that includes the location of the container 201. The remote subsystem 102 may estimate the amount of water within the container 201 based on the dimensions of the container 201 and the amount of precipitation. Based on an amount of water within the container 201, the remote subsystem 102 can adjust the weight of the recyclable material 214.

Another characteristic of the recyclable material 214 that can be determined based on the monitored parameters generated by the monitoring devices 200 is a condition of the recyclable material. The condition of the recyclable material represents a length of processing time and/or amount of processing needed to recycle the recyclable material. The condition can represent extraneous compounds, such as paint and/or decorations (e.g., plaster, wire, insulation, etc.), along a surface of the recyclable material, which increases the processing needed to recycle the recyclable material relative to cleaner, barer recyclable materials. For example, additional processing may be required to wash the paint and/or remove the decorations from the recyclable material 214. The paint and/or decorations on the recyclable material can be identified based on the image of the recyclable material generated by the camera 204, emissivity measured by the infrared sensor 203, and/or the like. For example, the image of the recyclable material 214 generated by the camera 204 includes different pixel colors and/or intensities within the image. The different pixel colors and/or intensities may be indicative of paint and/or decorations along the surface of the recyclable material 214. The remote subsystem 102 may analyze the images and identify pixels having different colors and/or intensities representing the recyclable material. The difference in pixel colors can represent paint and/or decorations on the surface of the recyclable material.

In another example, the condition of the recyclable material 214 may be determined based on the emissivity of the recyclable material 214. The emissivity of the recyclable material 214 is affected by compounds on the surface of the recyclable material. In general, recyclable material that includes more paint and/or decorations may have a higher emissivity relative to bare recyclable materials. For example, bare portions of the recyclable material may have an emissivity value of 0.2 as measured by the infrared sensor 203, which represents aluminum. Paint and/or decorations on the surface of the aluminum may result in a measured emissivity ranging from 0.3-0.6. The remote subsystem 102 receives the emissivity measurements from the infrared sensor 203 (or calculates the emissivity values from infrared sensor measurements received from the sensor 203). For example, if the emissivity along the surface of the recyclable material 214 within the container 201 fluctuates between 0.2 and a range between 0.3 and 0.6, then the remote subsystem 102 may determine, based on peaks of the emissivity, that paint and/or decorations are present along the surface of the recyclable material 214.

In FIG. 2, although the controller circuit 202 and the communication device 205 are shown as discrete boxes separate from each of the monitoring devices 200, it is recognized that the controller circuit 202 and/or the communication device 205 may be integrated into a unitary, physical package with one or more of the monitoring devices 200. For example, the camera 204 may be integrated with the controller circuit 202 and/or the communication device 205, such that the camera hardware is mechanically connected to the hardware of the controller circuit 202 and/or the communication device 205.

Figure 3:
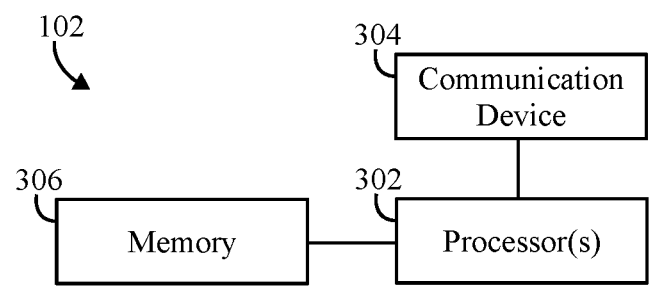
FIG. 3 illustrates a schematic diagram of components of a remote subsystem of the monitoring system according to an embodiment.

FIG. 3 illustrates a schematic diagram of components of the remote subsystem 102 of the monitoring system 100 according to an embodiment. The remote subsystem 102 includes one or more processors 302, a communication device 304, and a memory 306. The one or more processors 302 are operably connected to both the communication device 304 and the memory 306. The one or more processors 302 receive the data generated by the monitoring devices 106 via the communication device 304, and may store the received data in the memory 306. The one or more processors 302 may be similar in construction to the controller circuit 202 shown in FIG. 2. The communication device 304 may be similar in construction to the communication device 205 shown in FIG. 2. The memory 306 may be a tangible and non-transitory computer-readable medium such as flash memory, RAM, ROM, EEPROM, and/or the like. The memory 306 may store various pre-loaded information (e.g., programmed instructions), such as functions for determining one or more of the characteristics based on received monitored parameters, a database of emissivity levels associated with known materials, a database of X-ray emission lines associated with known materials, a database of density values of known materials, known dimensions of the containers 104, and/or the like. The one or more processors 302 may access the memory 306 to retrieve information to perform one or more operations described herein.

The one or more processors 302 may be configured to analyze the data generated by the monitoring devices 106, which is received by the communication device 304 along the uni-directional and/or bi-directional communication links. For example, the one or more processors 302 are configured to determine one or more characteristics of the recyclable material, such as the type, weight, fullness, and/or the like, as described herein, based on data received from the monitoring devices 106 and information stored in the memory 306.

In addition to receiving data (e.g., sensor measurements) from the monitoring devices 106, the communication device 304 of the remote subsystem 102 may also be configured to establish communications with the client entity in possession of the containers 104. The communications enable the client entity to track and monitor the progress of the recyclable material processing by the provider entity, which may make the entire exchange more transparent and may provide more information and/or quicker updates to the client entity relative to known practices, which may include waiting until processing is completed before sending a short, conclusory statement about the recyclable material. The communications generated by the remote subsystem 102 to the client entities may include status notifications, periodic statements, transaction summaries, scheduled pickup dates, and/or the like. The communications may be transmitted directed to the client computing devices 108, such as in the form of text messages or notifications through a specific application downloaded on the client computing devices 108. Alternatively, the client entity may utilize the client computing devices 108 to access the communications generated by the remote subsystem 102 via an Internet-based web portal. For example, the communications may be formatted and displayed on a user interface of a website or a downloaded application in response to a user (e.g., an employee at the client entity) successfully logging into a password-protected account via a client computing device 108.

The information that is made available to the client entity, via direct messaging or online access (e.g., website or application), may include one or more of the determined characteristics of the recyclable material described above, such as an estimated weight of the recyclable material, an automatically determined type of the recyclable material, a fullness of the recyclable material within the container, a condition of the recyclable material, and/or the like. A non-limiting example summary may provide the determined type of the recyclable material as aluminum. The summary may provide the condition of the recyclable material represented by or including an amount of time required to process (e.g., recycle) the recyclable material. The amount of the recyclable material in the summary may include adjustments based on water and/or other materials in the container, and may also provide the determined amounts of water and/or other materials. The information made available to the client entity may also include price and payment information, such as the market price of the type of the recyclable material (e.g., market price of aluminum or copper), payments previously made to the client entity, an expected payment to be made to the client entity based on the estimated weight and type of the recyclable material prior to completing processing, and/or the like. The information made available to the client entity may also include container drop off and pickup information.

In an embodiment, the remote subsystem 102 (e.g., the one or more processors 302 thereof) automatically schedules a pickup date for the containers that hold the recyclable material. The pickup date refers to a calendar day, and optionally also indicates a specific time or time range within that calendar day. For example, the pickup date can be scheduled for November $4^{th}$, and optionally may include a time range between 8 AM and 11 AM, or a specific time of 10 AM. The pickup date may be automatically scheduled based on one or more of the characteristics determined using the monitoring devices 106.

For example, the remote subsystem 102 may schedule the pickup date based on the fullness or volume of the recyclable material within a given container. The remote subsystem 102 may determine the fullness or volume according to images generated by the imaging device (e.g., camera) mounted to the container depicting the interior of the container, or via the other methods for determining fullness described above. The remote subsystem 102 may compare the fullness to a designated threshold fullness, which may be a numerical volume or a designated reference marker along the height of the container. In response to the determined fullness exceeding the threshold fullness, the remote subsystem 102 is configured to schedule the pickup date. The pickup date may be scheduled for the next available date, or for a date within a short time window, such as a week. The pickup date is scheduled with the goal of retrieving and replacing the container before the container reaches an overflow state, in which the client entity can no longer safely and/or properly deposit recyclable material into the container. The remote subsystem 102 may refer to a company schedule or calendar when determining the scheduled pickup date to avoid scheduling the pickup on a data that is unavailable, such as due to a conflict or a holiday.

Upon determining a pickup date, the remote subsystem 102 may be configured to communicate, via the communication device 304, the pickup date to the client entity in possession of the container that is to be picked up. The communication may request confirmation from the client entity that the pickup date is agreeable to the client entity. If the remote subsystem 102 receives confirmation from the client entity, via a client computing device 108, then the remote subsystem 102 confirms the scheduled pickup date, and may store the scheduled pickup date and associated details in the memory 306 or another storage device. The communication to the client entity may also provide the client entity with alternative pickup times and/or dates that are available. If the remote subsystem 102 receives a user selection indicating one of the alternative pickup times and/or dates, the remote subsystem 102 schedules the selected alternative time and/or date as the scheduled pickup time and/or date.

As an alternative to fullness or volume (or in addition), the remote subsystem 102 may schedule the pickup date based on the determined rate at which the recyclable material is deposited into the container. For example, the remote subsystem 102 can monitor the rate of increase of the weight and/or volume (or fullness) of the recyclable material within the container overtime to determine a fill rate (e.g., rate of increase in volume or weight over time). Based on the fill rate, the remote subsystem 102 may forecast an overflow date, which refers to when the amount of recyclable material within the container exceeds a capacity level of the container. The remote subsystem 102 is configured to automatically schedule the pickup date for day and/or time that is prior to the overflow date. For example, if the overflow date is estimated to be 14 days in the future, the remote subsystem 102 may schedule the pickup date within the next two weeks such that the container is picked up before the overflow date.

The automatic scheduling of container pickup provides multiple advantages. For example, the client entity in possession of the container does not have to actively monitor the fullness of the container, or worry about the container overfilling which would require stopping recyclable material deposits into the container. For the processing entity that picks up and processes the recyclable material, the automatic scheduling may improve efficiency by ensuring that the containers that are picked up have at least a designated lower limit of recyclable material therein. Thus, the automatic scheduling reduces premature pickups in which a driver travels to a client entity site to pick up a container that has only a limited amount of recyclable material within.

Optionally, the remote subsystem 102 may utilize other characteristics of the recyclable material for scheduling the pickup time. For example, in response to determining a type of the recyclable material, the remote subsystem 102 may monitor market prices for that type of the recyclable material. For example, the remote subsystem 102 may identify peaks in the market price, and automatically schedule the pickup time based on the peak. Optionally, the remote subsystem 102 may adjust the pickup time based on the condition (e.g., paint, decoration, water) of the recyclable material. For example, the remote subsystem 102 identifies paint, decorations, and/or water along the surface of the recyclable material. The remote subsystem 102 estimates a cost based on the extended processing to recyclable the recyclable material for the paint, decorations, and/or water on the surface of the recyclable material. Responsive to the estimating the processing cost, the remote subsystem 102 waits for the market price of the type of recyclable material to offset the cost of the increased processing time. For example, the remote subsystem 102 may be configured to wait until the market price for the recyclable material is higher than the additional cost to process the recyclable material.

Although the example described above refers to a single container, it is recognized that the remote subsystem 102 may track the contents of multiple containers (e.g., the containers 104 shown in FIG. 1), and automatically schedule individual pickup dates for each of the containers.

The following is a non-limiting example explanation of how the monitoring system 100 described herein may be utilized to provide upfront information, real-time tracking, and automated pickup scheduling of an exchange of recyclable material between a processing entity and a client entity (or provider of the recyclable material). Upon establishing an agreement, the processing entity drops off one or more containers on one or more sites of the client entity. The following description is specific to a single container, but the other containers may be handled similarly. The container may have an imaging device (e.g., imaging device 124 shown in FIG. 1) mounted on the container and set up with a field of view that includes an interior of the container. The imaging device generates image data depicting the interior of the container. For example, the imaging device may generate a designated number of still images each day at designated times, such as three images generated at different times of the day. The imaging device may transmit the images to the remote subsystem 102 via a communication device (e.g., the communication device 205 shown in FIG. 2).

The remote subsystem 102 receives the image data (e.g., the images) and performs image analysis to determine one or more characteristics of the recyclable material within the container, such as the fullness of the recyclable material and/or the fill rate, based on the image data. The remote subsystem 102 may not take any responsive action if the fullness level and/or the fill rate are below designated thresholds. Once the fullness level exceeds a designated threshold fullness relative to the size of the container and/or the fill rate indicates an approaching overflow date (e.g., within 1-4 weeks away, for example), the remote subsystem 102 is configured to schedule a pickup date based on the fullness level and/or the fill rate. For example, fullness level and/or fill rate may be used to predict an overflow date of the container, in which the amount of recyclable material within the container exceeds a full capacity level, and the pickup date may be scheduled to take place prior to the overflow date.

Upon scheduling a pickup date, the remote subsystem 102 may communicate the scheduled pickup date to the client entity via a direct message or notification on a client computing device (e.g., device 108 shown in FIG. 1). The remote subsystem 102 may be owned or controlled by the processing entity, such as located at a facility of the processing entity. The remote subsystem 102 may schedule the pickup date based on a known schedule or calendar of the processing entity to ensure that the processing entity is available for pickup on the scheduled pickup date. Upon confirmation of the scheduled pickup date, the remote subsystem 102 may store the scheduled pickup information in a memory.

On or before the scheduled pickup date, the remote subsystem 102 may provide driver information to the client entity via the client computing device(s). The driver information includes the driver name, optionally a photograph of the driver, and/or the like, of the driver scheduled to arrive on the client site to pick up and replace the container that holds the recyclable material. The driver information may also include an estimated time of arrival and/or a current location of the driver. The current location may be determined by GPS or the like. Therefore, when the driver arrives on the client site, the client entity is forewarned and is not suspicious of the driver's intentions if the driver matches the information provided. The communication of driver information may alleviate any suspicions that the driver is attempting to fraud the client entity and steal the recyclable material.

As the filled container is picked up on the truck driven by the driver (e.g., the truck 112 shown in FIG. 1), the truck may be outfitted with one or more monitoring devices. For example, the truck may be the truck 112 shown in FIG. 1 that includes a weight sensor or scale 122 and an imaging device 120. As the container is loaded onto the truck, a measurement of the container is generated by the weight sensor, which provides an initial measurement of the combined weight of the container and all contents. In addition, the imaging device 120 may generate an image of the container on the truck, showing the recyclable material therein. The image and weight measurement may be communicated remotely to the remote subsystem 102. The remote subsystem may make this information available to the client entity via a direct notification or via a user interface within a user account on a website or a downloaded application. While the truck is still at the client entity site, the remote subsystem (or a computing device onboard the truck) may subtract a pre-measured weight of that specific container, when empty, from the combined weight measurement generated by the onboard weight sensor to estimate a weight of the recyclable material within the container. Optionally, the estimated weight of the recyclable material may be adjusted for the determined presence and amount of water and/or other materials based on moisture sensors or the like. The monitoring system may provide the estimated weight of the recyclable material and/or the image generated by the imaging device 120 to the client entity while the truck is still on the premises, such as via a physical ticket that is printed out of a printer onboard the truck or via a notification displayed on a client computing device.

Upon leaving the client entity site with the container holding the recyclable material, the truck optionally may transport the container to a third party entity for weighing the container before transporting the container to a facility (e.g., the facility 114 shown in FIG. 1) of the processing entity for processing the recyclable material. The container and/or the truck may be weighed at the facility of the processing entity. In an embodiment, the remote subsystem 102 may receive the weight measurements generated by the scale of the third party entity and by the scale of the processing entity, and may make all such measurements available to the client entity. Therefore, the client entity can view how the measured weight by the processing entity compares to the measured weight by an independent third party. It is expected that the different measurements would be within a designated tolerance range of each other (e.g., 200 lbs or the like). The remote subsystem 102 may also receive image data (e.g., images) that correspond in time and location to the different weight measurements. The remote subsystem 102 may group the image data with the weight measurements, as the image data provides visual evidence that the recyclable material has not be tampered with (e.g., removed, replaced, contaminated, etc.) at each stage in the transportation process.

After processing the recyclable material from the container at the facility, the remote subsystem 102 may generate a summary of the transaction for communication to the client entity. The summary, as described above, may detail several determined characteristics of the recyclable material, such as the primary type of material therein, the weight of recyclable material, the condition of the recyclable material, the presence and/or weight of water or other materials, and the like. The summary may also include the price of the recyclable material, which may include a breakdown that includes the market price, and the total payment that is owed to the client entity in the transaction for the recyclable material. The summary optionally may include historical information detailing prior transactions between the two parties for recyclable material.

The container that is dropped off at the client entity site during the scheduled pickup date may include one or more monitoring devices thereon, such as an imaging device. The remote subsystem 102 is configured to monitor the recyclable material that is added to the new container in the same way as the previous container that was picked up. For example, the remote subsystem 102 may automatically schedule pickup for the new container when appropriate based on the recyclable material that is deposited into the container.

Figure 4:
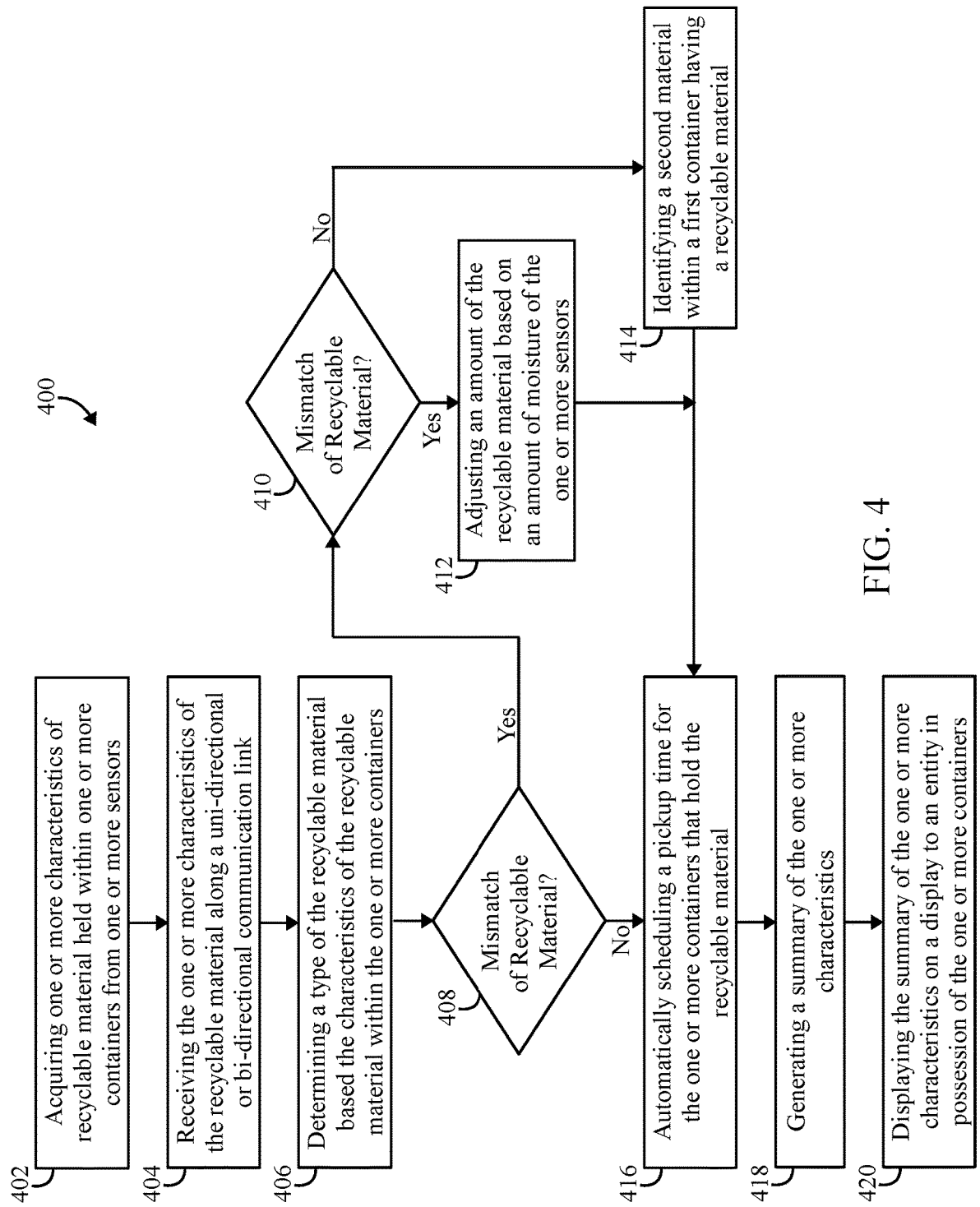
FIG. 4 is a flowchart of a method of automatically monitoring recyclable materials within one or more containers according to an embodiment.

FIG. 4 is a flowchart of a method 400 for automatically monitoring recyclable materials within one or more containers according to an embodiment. The method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

Beginning at 402, the one or more sensors (or monitoring devices) acquire one or more characteristics of recyclable material held within one or more containers. For example, the sensors measure the one or more characteristics of the containers. The one or more characteristics may include at least one of a weight acquired from one or more weight sensors, images of the recyclable material generated by a camera, a type of the recyclable material (e.g., determined by an x-ray sensor, infrared sensor, analysis by one or more processors), additional material with the recyclable material (e.g., second material, water), condition of the recyclable material (e.g., paint, decorations), and/or the like.

At 404, the remote subsystem receives the one or more characteristics of the recyclable material along a uni-directional or bi-directional communication link. For example, the remote subsystem is remotely located relative to the sensors. A controller circuit at the sensors may instruct a communication device at the sensors to transmit the sensor measurement signals acquired by the sensors via a uni-directional and/or a bi-directional communication link to the remote subsystem 102.

At 406, a type of the recyclable material within the container is determined based on the parameters or characteristics of the recyclable material received from the sensors (e.g., monitoring devices). The type indicates a specific compound or element that represents a majority of the recyclable material, such as aluminum, iron, copper, steel, or the like.

At 408, the remote subsystem determines whether there is a mismatch of the determined type of the recyclable material. For example, there is a mismatch if two different methods for determining the type of recyclable material result do not match within a designated error tolerance margin (e.g., 2%, 5%, 10%, or the like). The mismatch could indicate the presence of a different type of material within the container besides the recyclable material. For example, the mismatch can represent a second material that does not match the type of the recyclable material. The second material can be based on a difference in densities determined by the remote subsystem based on the identification of the type. Additionally or alternatively, the second material may be identified by the remote subsystem based on different emissivity and/or X-ray emission lines measured by the infrared sensor and the X-ray sensor, respectively.

Responsive to the remote subsystem identifying a mismatch of the recyclable material, at 410, the remote subsystem determines whether the mismatch is due to moisture. For example, the remote subsystem may identify moisture, such as rain, that is within the container due to measurements received from the moisture sensor.

Responsive to determining that moisture is present, then at 412, the remote subsystem adjusts a determined weight of the recyclable material based on the estimated amount of moisture to account for the added weight of the water.

If the mismatch is determined to not be caused by the presence of moisture, then at 414, the remote subsystem may identify the presence of a second material within the container besides the recyclable material. For example, the controller circuit 302 may identify a second material based on image analysis of image data of the recyclable material, activation of the x-ray sensor, and/or activation of the infrared sensor.

At 416, the remote subsystem automatically schedules a pickup time for the containers that hold the recyclable material. The pickup time can be based on at least one of a market price of the recyclable material, a schedule of pickup times, a rate of recyclable material received by the one or more containers, or a weight of the recyclable material in the one or more containers. For example, the remote subsystem may automatically schedule the pickup time based on the rate of increase (e.g., fill rate) of the recyclable material in the containers.

At 418, the remote subsystem generates a summary of the one or more characteristics. The summary includes at least one of a price for the recyclable material, a pickup time for the recyclable material, a mass and/or weight of the recyclable material, a market rate for the recyclable material, a condition of the recyclable material, and/or the like. For example, the summary is configured to provide transparency for the processing of the recyclable material. The summary includes the price for the recyclable material. The price can be based on the mass and/or weight of the recyclable material within the containers at the market price at the pickup time. Optionally, the summary includes alternative pickup times with predicted market prices for the recyclable material. Additionally or alternatively, the summary includes the second material and/or moisture identified by the remote subsystem within the containers. The remote subsystem may adjust the weight of the recyclable material based on the presence of moisture and/or a second material within the containers. The summary may be transmitted along a uni-directional and/or bi-directional communication link with the client computing device (e.g., endpoint). The endpoint is owned or controlled by a client entity in possession of the containers.

At 420, the endpoint displays the summary of the one or more characteristics on a display to the entity in possession of the one or more containers for providing the information to the client entity.

It should be noted that the particular arrangement of elements (e.g., the number, types, placement, or the like) of the illustrated embodiments described herein may be modified in various alternate embodiments. For example, in various embodiments, different numbers of a given device, unit, or module may be employed. In various embodiments, a different type or types of a given device, unit, or module may be employed. In various embodiments, a number of devices, units, or modules (or aspects thereof) may be combined. In various embodiments, a given device, unit, or module may be divided into plural devices (or sub-devices) or plural units (or sub-units) or plural modules (or sub-modules). In various embodiments, one or more aspects of one or more devices, units, or modules may be shared between devices, units, modules. In various embodiments, a given device, unit, or module may be added or a given device, unit, or module may be omitted.

As used herein, a processor or a processing unit includes processing circuitry configured to perform one or more tasks, functions, or steps, such as those described herein. For instance, the processor may be a logic-based device that performs operations based on instructions stored on a tangible and non-transitory computer readable medium, such as memory. It may be noted that a "processor," as used herein, is not intended to necessarily be limited to a single processor or single logic-based device. For example, the processor may include a single processor (e.g., having one or more cores), multiple discrete processors, one or more application specific integrated circuits (ASICs), and/or one or more field programmable gate arrays (FPGAs). In some embodiments, the processor is an off-the-shelf device that is appropriately programmed or instructed to perform operations, such as the algorithms described herein.

The processor may also be a hard-wired device (e.g., electronic circuitry) that performs the operations based on hard-wired logic that is configured to perform the algorithms described herein. Accordingly, the processor may include one or more ASICs and/or FPGAs. Alternatively or in addition to the above, the processor may include or may be associated with a tangible and non-transitory memory having stored thereon instructions configured to direct the processor to perform the algorithms described herein.

It is noted that operations performed by the processor (e.g., operations corresponding to the methods/algorithms described herein, or aspects thereof) may be sufficiently complex that the operations may not be performed by a human being within a reasonable time period based on the intended application of the assay system. The processor may be configured to receive signals from the various subsystems and devices of the system or user inputs from the user. The processor may be configured to perform the methods described herein.

Processors may include or be communicatively coupled to memory. In some embodiments, the memory may include non-volatile memory. For example, the memory may be or include read-only memory (ROM), random-access memory (RAM), electrically erasable programmable read-only memory (EEPROM), flash memory, and the like. The memory may be configured to store data regarding operating parameters of the system 400.

In an example embodiment, the processor executes a set of instructions that are stored in one or more storage elements, memories, and the like. Embodiments include non-transitory computer-readable media that include set of instructions for performing or executing one or more processes set forth herein. Non-transitory computer readable media may include all computer-readable media, except for transitory propagating signals per se. The non-transitory computer readable media may include generally any tangible computer-readable medium including, for example, persistent memory such as magnetic and/or optical disks, ROM, and PROM and volatile memory such as RAM. The computer-readable medium may store instructions for execution by one or more processors.

The set of instructions may include various commands that instruct the system to perform specific operations such as the methods and processes of the various embodiments described herein. The set of instructions may be in the form of a software program. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A system comprising:
    at least one imaging device mounted on a container and positioned to have a field of view of an interior of the container, the at least one imaging device configured to generate image data depicting recyclable material within the container;
    at least one weight sensor configured to generate weight data corresponding to the container; and
    one or more processors configured to:
    determine an estimated volume of the recyclable material within the container based on the image data;
    determine an estimated weight of the recyclable material within the container based on the weight data;
    calculate an estimated density of the recyclable material based on the estimated volume and the estimated weight and
    determine a type of the recyclable material within the container by matching the estimated density to a first known material type of multiple different known material types in a look-up table.

2. The system of claim 1, wherein the one or more processors are configured to generate a notification message for communication to an entity in possession of the container, the notification message providing the type of the recyclable material that is determined.

3. The system of claim 1, wherein the one or more processors are configured to generate a summary that includes the type of the recyclable material that is determined, the one or more processors configured to display the summary on a display device to an entity in possession of the container.

4. The system of claim 1, wherein the weight data generated by the at least one weight sensor represents a total weight of the container, and
    the one or more processors are configured to determine the estimated weight of the recyclable material based on a difference between the total weight of the container and a pre-measured weight of the container when empty.

5. The system of claim 1, further comprising one or more moisture sensors mounted to the container and configured to generate moisture signals that represent an amount of moisture within the container,
    wherein the one or more processors are configured to estimate a weight of moisture within the container based on the moisture signals, and
    the estimated weight of the recyclable material within the container based at least in part on subtracting the weight of moisture from a value of the weight data generated by the at least one weight sensor.

6. The system of claim 5, wherein the one or more moisture sensors include multiple moisture sensor mounted to the container at different heights along one or more walls of the container.

7. The system of claim 1, wherein the one or more processors are configured to determine the estimated volume of the recyclable material within the container based at least in part on performing image analysis on the image data that is received to identify boundaries of the recyclable material and estimating, based on stored physical dimensions of the container, a volume of available space within the container.

8. The system of claim 1, further comprising an infrared sensor mounted to the container and positioned to measure an emissivity value representing an amount of thermal radiation emitted by the recyclable material within the container, and the one or more processors are configured to receive and analyze the emissivity value.

9. The system of claim 8, wherein the type of the recyclable material that is determined based on the estimated density is a first type, and the one or more processors are configured to at least one of confirm the first type or determine a second type of the recyclable material within the container by comparing the emissivity value to a list of emissivity values associated with multiple different known material types in a second look-up table.

10. The system of claim 1, further comprising an x-ray sensor mounted to the container and positioned to measure an x-ray diffraction value representing x-ray diffraction of the recyclable material, and the one or more processors are configured to receive and analyze the x-ray diffraction value.

11. The system of claim 10, wherein the type of the recyclable material that is determined based on the estimated density is a first type, and the one or more processors are configured to at least one of confirm the first type or determine a second type of the recyclable material within the container by comparing the x-ray diffraction value to a list of x-ray diffraction values associated with multiple different known material types in a second look-up table.

12. A system comprising:
    at least one imaging device mounted on a container and positioned to have a field of view of an interior of the container, the at least one imaging device configured to generate image data depicting recyclable material within the container;
    at least one weight sensor configured to generate weight data corresponding to the container;
    at least one moisture sensor mounted to the container and configured to generate moisture data that represent an amount of moisture within the container; and
    one or more processors configured to:
    determine an estimated volume of the recyclable material within the container based on the image data;
    determine an estimated weight of the recyclable material within the container based on the weight data and the moisture data;
    calculate an estimated density of the recyclable material based on the estimated volume and the estimated weight;
    determine a type of the recyclable material within the container by matching the estimated density to a first known material type of multiple different known material types in a look-up table; and
    generate a notification message for communication to an entity in possession of the container, the notification message providing the type of the recyclable material.

13. The system of claim 12, wherein the one or more processors are configured to determine the estimated volume of the recyclable material within the container based at least in part on performing image analysis on the image data that is received and estimating, based on stored physical dimensions of the container, a volume of available space within the container.

14. The system of claim 12, wherein the weight data generated by the at least one weight sensor represents a total weight of the container, and the one or more processors are configured to determine the estimated weight of the recyclable material based on a difference between the total weight of the container and a pre-measured weight of the first container when empty.

15. The system of claim 12, further comprising an x-ray sensor mounted to the container and positioned to measure an x-ray diffraction value representing x-ray diffraction of the recyclable material, and the one or more processors are configured to receive and analyze the x-ray diffraction value.

16. The system of claim 15, wherein the type of the recyclable material that is determined based on the estimated density is a first type, and the one or more processors are configured to at least one of confirm the first type or determine a second type of the recyclable material within the container by comparing the x-ray diffraction value to a list of x-ray diffraction values associated with multiple different known material types in a second look-up table.

17. A system comprising:
  monitoring devices mounted on a container configured to hold recyclable material, the monitoring devices configured to generate data representing different corresponding monitored parameters of the recyclable material within the container, wherein the monitoring devices comprise at least one weight sensor and at least one imaging device, the at least one weight sensor configured to generate weight data representing a weight of the recyclable material within the container, the at least one imaging device configured to generate image data depicting the recyclable material within the container; and
  one or more processors configured to receive the data generated by the monitoring devices, the one or more processors configured to determine an estimated volume of the recyclable material within the container based on the image data and to determine an estimated weight of the recyclable material within the container based on the weight data, the one or more processors configured to: (i) calculate an estimated density of the recyclable material based on the estimated volume and the estimated weight, (ii) compare the estimated density to a look-up table listing known material types and associated densities, and (iii) determine a type of the recyclable material within the container by matching the estimated density to one of the known material types in the look-up table;
  wherein the one or more processors are configured to generate a summary that indicates the type of the recyclable material that is determined, and to control communication of the summary to a computing device of an entity that deposited the recyclable material into the container.

18. The system of claim 17, wherein the monitoring devices additionally comprise at least one of a moisture sensor, a proximity sensor, a structured light array, a magnet, or an X-ray sensor.

19. The system of claim 17, wherein the one or more processors are configured to schedule a pickup date for the container based on the estimated volume of the recyclable material within the container.

20. The system of claim 17, further comprising one or more moisture sensors mounted to the container and configured to generate moisture signals that represent an amount of moisture within the container, wherein the one or more processors are configured to estimate a weight of moisture within the container based on the moisture signals, and determine the estimated weight of the recyclable material within the container based at least in part on subtracting the weight of moisture from a value of the weight data generated by the at least one weight sensor.

* * * * *